(12) United States Patent
Kodner et al.

(10) Patent No.: US 10,057,349 B2
(45) Date of Patent: Aug. 21, 2018

(54) DATA STREAM CONSOLIDATION IN A SOCIAL NETWORKING SYSTEM FOR NEAR REAL-TIME ANALYSIS

(71) Applicant: Facebook, Inc., Menlo Park, CA (US)

(72) Inventors: Neil A. Kodner, Saratoga, CA (US); Jason Sundram, San Francisco, CA (US); Guven Burc Arpat, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 322 days.

(21) Appl. No.: 14/939,850

(22) Filed: Nov. 12, 2015

(65) Prior Publication Data

US 2017/0142200 A1    May 18, 2017

(51) Int. Cl.
    *H04L 29/08* (2006.01)
(52) U.S. Cl.
    CPC .......... *H04L 67/1097* (2013.01); *H04L 67/22* (2013.01)
(58) Field of Classification Search
    CPC .................. H04L 67/1097; H04L 67/22
    See application file for complete search history.

(56) References Cited

U.S. PATENT DOCUMENTS

| | | | |
|---|---|---|---|
| 2015/0025977 A1* | 1/2015 | Doyle | G06Q 50/01 705/14.66 |
| 2015/0121252 A1* | 4/2015 | Yerli | H04L 65/4069 715/753 |
| 2016/0162532 A1* | 6/2016 | Zhang | G06F 17/30362 707/704 |
| 2016/0212023 A1* | 7/2016 | Mohan | H04L 43/045 |
| 2017/0091628 A1* | 3/2017 | Nachman | G06N 5/04 |
| 2017/0103783 A1* | 4/2017 | Paglia | G11B 27/036 |
| 2017/0142200 A1* | 5/2017 | Kodner | H04L 67/1097 |

* cited by examiner

Primary Examiner — Jerry B Dennison
(74) Attorney, Agent, or Firm — FisherBroyles, LLP

(57) ABSTRACT

Some embodiments include a stream consolidation engine in a social networking system. The stream consolidation engine can receive two or more input data streams (e.g., an activity record data stream and an application service output stream) from the social networking system. The stream consolidation engine can merge an activity record from the activity record data stream with at least a data record from the input data streams (e.g., from the activity record data stream or the application service output stream) to create a conglomerate data record. The stream consolidation engine can supplement the conglomerate data record with asynchronous information from a data storage or derivative data computed based on content in or referenced by the conglomerate data record. The stream consolidation engine can publish the conglomerate data record in a consolidated data stream. The consolidated data stream can be substantially synchronous to at least one of the input data streams.

19 Claims, 8 Drawing Sheets

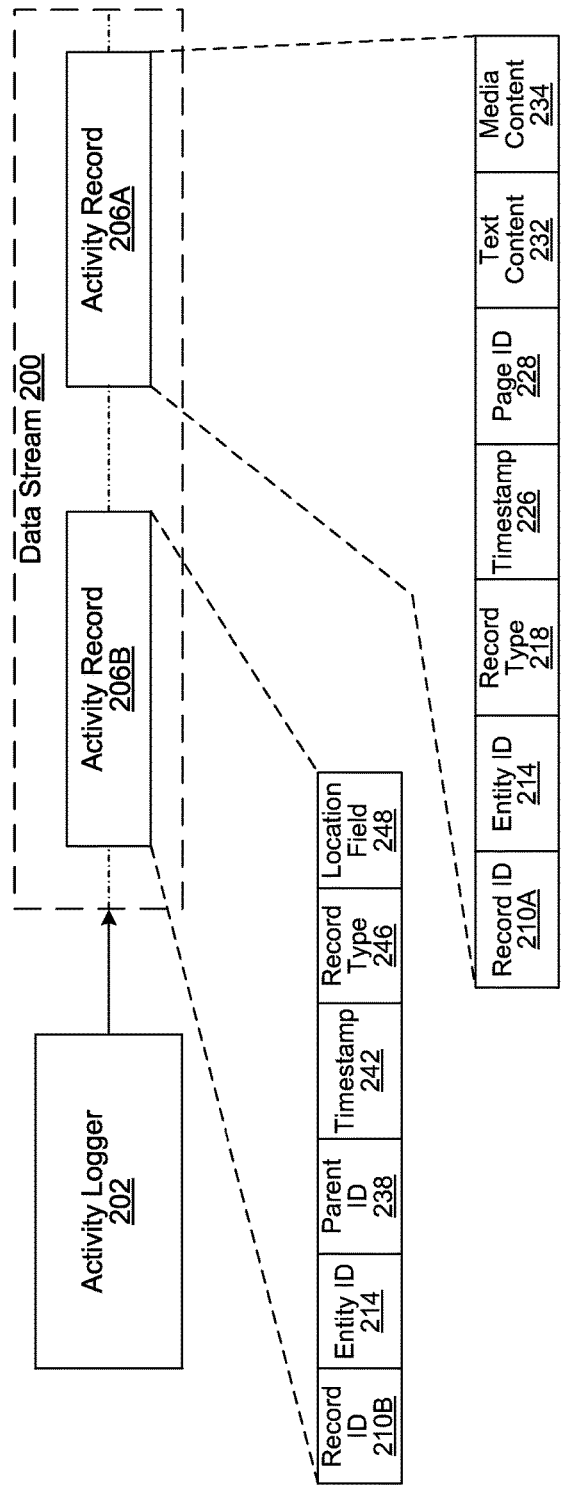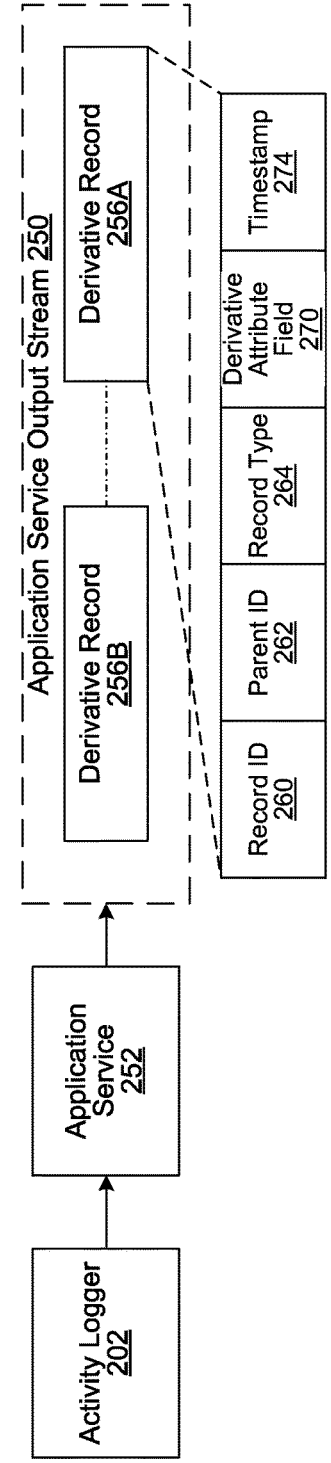
FIG. 2A
FIG. 2B

DATA STREAM CONSOLIDATION IN A SOCIAL NETWORKING SYSTEM FOR NEAR REAL-TIME ANALYSIS

BACKGROUND

Machine intelligence is useful to gain insights to a large quantity of data that is undecipherable to human comprehension. Machine intelligence, also known as artificial intelligence, can encompass machine learning analysis (e.g., supervised machine learning, unsupervised machine learning, or deep machine learning), natural language parsing and processing, computer perception, or any combination thereof. Machine intelligence (or learning) can facilitate studies and researches yielding specialized insights that are normally not attainable by human mental exercises.

Machine intelligence can be used to analyze digital conversations, publications, or other content that human beings may generate ("user generated content"). The digital conversations, publications, or other user-generated content can be collectively referred to as "digital chatter." For example, a machine intelligence analysis engine can identify patterns in the digital chatter that may be pertinent in making real-world decisions or otherwise recognizing patterns. This process is often referred to as "data mining." Various application services of the social networking system capture, derive or generate information that may be relevant to a machine intelligence analysis engine. Various application services of the social networking system can benefit from the insights produced by the machine intelligence analysis engine. However, because of the distributed nature of the application services in a social networking system, it is computationally expensive and challenging to timely produce insights (e.g., identify patterns) before the insights or the patterns become irrelevant.

BRIEF DESCRIPTION OF THE DRAWINGS

FIG. 2A is a block diagram illustrating an example of a portion of a data stream of user activity records, in accordance with various embodiments.

FIG. 2B is a block diagram illustrating an example of a portion of an application service output stream, in accordance with various embodiments.

Figure 1:
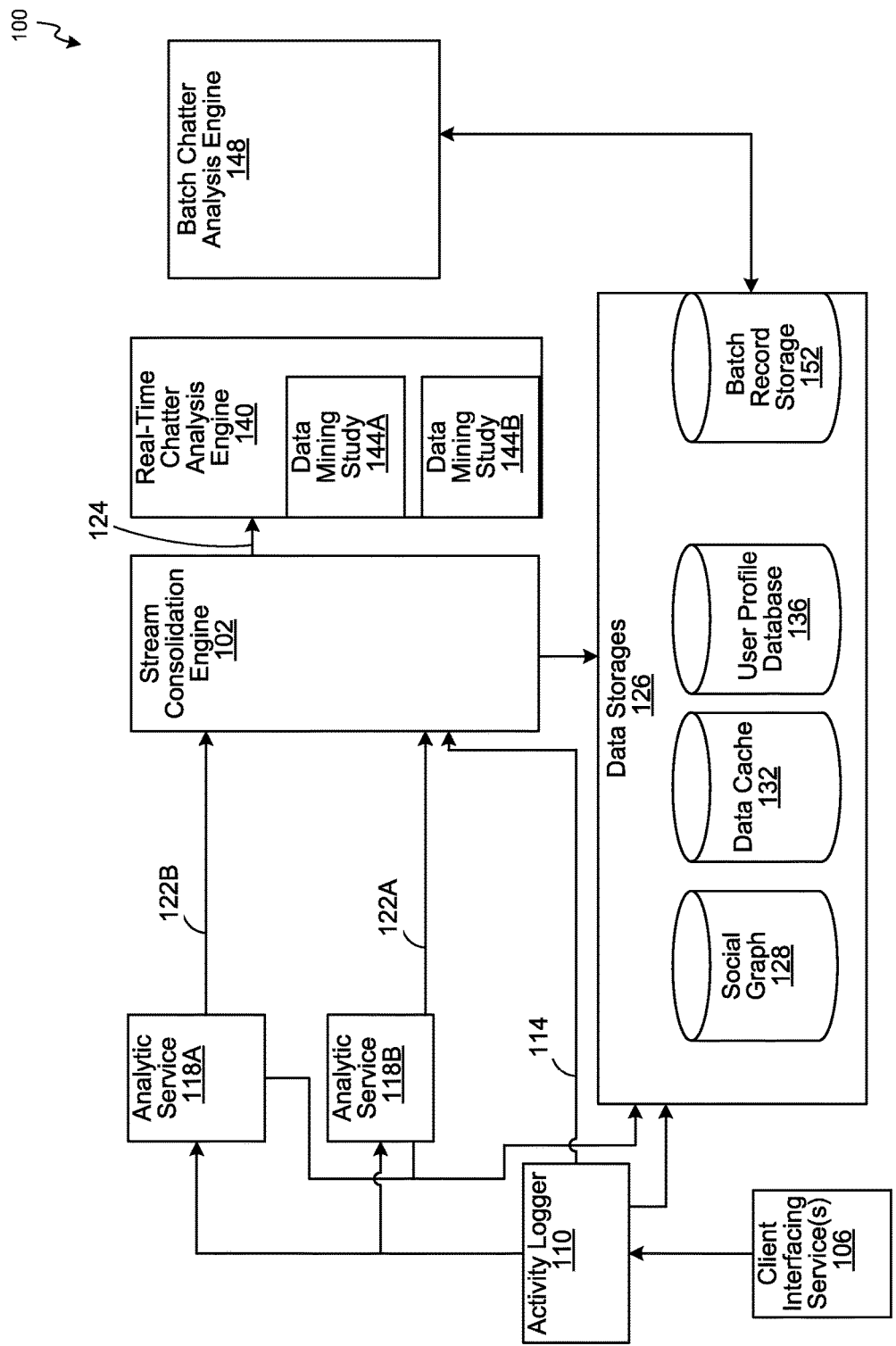
FIG. 1 is a block diagram illustrating a social networking system implementing a stream consolidation engine, in accordance with various embodiments.

The figures show various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments enable a social networking system to provide a system platform to perform real-time data mining ("data analysis") of social network activities utilizing a data stream stitching technique for entity activity records. The data stream stitching technique merges multiple input data streams together, homogenizes heterogeneous data records from one or more input data streams, insert one or more additional data fields or data entries from a data storage or by computing derivative from the input data streams. A stream consolidation system can subscribe to multiple data streams (e.g., an activity record data stream and one or more application service output streams) in a social networking system. The activity record data stream can be a data stream having data records representative of user activities in a social networking system. An application service output stream can be a data stream produced by an application service that processes at least part of the activity record data stream to produce additional information. The stream consolidation system can produce a single consolidated data stream having consolidated activity records (herein referred to as "conglomerate data records") that represent user activities happening near real-time within the social networking system. A "conglomerate data record" is a data record in the consolidated data stream. Conventional analytic systems analyze digital chatter asynchronously by processing batch user activity records from data storages. Because potential raw data records, metadata records, and derivative data records pertaining to the same user activity are scattered in different data streams that are not synchronized, conventional analytic systems cannot practically filter and categorize the data records for analysis.

Typically, an action logger in a social networking system generates an activity record data stream that involves multiple types of data records each having multiple data fields. Various systems in the social networking system also produce subscribable streams of different types of data records (e.g., including data streams that produce data records that are derivative from the activity records in the activity record data stream). For example, a topic tagger engine can be an application service that analyzes activity records with text content to generate a data stream of content concept identifier tags (e.g., topic identifier tags). The stream consolidation system is able to merge these streams together by correlating data records from multiple streams within a specified synchronization period. The stream consolidation system can, for example, combine multiple subscribable streams together by matching relevant identifiers (e.g., post IDs, user IDs, page IDs, etc.) to generate the consolidated data stream. The stream consolidation system can condense multiple records (e.g., data rows) of an existing subscribable steam into a single conglomerate data record and publish the conglomerate data record to the consolidated data stream.

The stream consolidation system can further augment the consolidated data stream by making cache lookups of readily available information. The stream consolidation system can supplement these information into the conglomerate data records of the consolidated data stream. The stream consolidation system can further implement one or more process logics to transform or analyze, in real-time, the existing streams to add computed data into the consolidated data stream. The consolidated data stream enables machine intelligence analysis engines to perform various real-time digital chatter studies. A digital chatter study can filter and aggregate conglomerate data records with a single pass filter, thereby enabling real-time data mining. The result of the data mining and/or analysis can be presented to users in various ways (e.g., a website dashboard). The website dashboard can display analytical insights in real-time or near real-time. When an analyst user reconfigures data mining logic (e.g., logic dictating how to transform input data records into real-time insights) associated with the website dashboard, real-time insights can be recalculated without reconfiguring the data collection logic (e.g., logic dictating how to collect input data and how to pre-process the input data for the data mining logic). That is, a single pass filter can easily pick out different information from the conglomerate data records after the consolidated data stream is generated. For example, the digital chatter study may be related to a political election or a sports event. An analyst user who is answering questions from an audience can try different data mining logic and get real-time answers and results with the consolidated data stream as an input.

Referring now to the figures, FIG. 1 is a block diagram illustrating a social networking system 100 implementing a stream consolidation engine 102, in accordance with various embodiments. The social networking system 100 provides one or more client interfacing services 106. The client interfacing services 106 are application services that communicate with client devices over one or more networks (e.g., a local area network and/or a wide area network). For example, the client interfacing services 106 can serve end-user device traffic over the Internet. The client interfacing services 106 can enable user accounts (e.g., social network accounts) to push user-generated content (e.g., messages, posts, status updates, or any combination thereof) from the client devices to the social networking system 100 for sharing with other users.

The social networking system 100 can provide the client interfacing services 106 via an application programming interface (API), a Web server, a mobile service server (e.g., a server that communicates with client applications running on mobile devices), or any combination thereof. In some embodiments, the social networking system 100 can be a social networking system (e.g., the social networking system 702 of FIG. 7). The client interfacing services 106 can process client requests in real-time. The client requests can be considered "live traffic." For example, the client interfacing services 106 can include a search engine, a photo editing tool, a location-based tool, an advertisement platform, a media service, an interactive content service, a messaging service, a social networking service, or any combination thereof.

An activity logger 110 can communicate with the client interfacing services 106 to collect one or more activity records characterizing the user interactions between the client devices and the client interfacing services 106. The activity logger 110 can generate an activity record data stream 114. The activity record data stream is an unbounded data stream. An "unbounded stream" is an open-ended sequence of data that is sent (e.g., continuously) to a recipient as the data becomes available from its source. The unbounded stream is not part of a data container (e.g., a file, a file folder, a volume, or any combination thereof) with a fixed file size. The activity record data stream is subscribable by application services of the social networking system 100.

For example, the activity record data stream 114 can provide an activity record to a subscribing application service in response to the activity record being made available to the activity logger 110.

In some embodiments, the social networking system 100 includes one or more analytic services (e.g., an analytic service 118A and an analytic service 118B, collectively as the "analytic services 118"). Each of the analytic services 118 can subscribe to the activity record data stream 114. For example, the analytic service 118A can be a topic tagger engine (e.g., the topic tagger engine 734 of FIG. 7) that analyzes textual content in or referenced by activity records in the activity record data stream 114 to produce a content concept identifier (e.g., a topic identifier). In several embodiments, the social networking system 100 stores content concept identifiers associated with various content topics. In another example, the analytic services 118 can include an image tagger engine (e.g., the image tagger engine 736 of FIG. 7) that analyzes image content in or referenced by activity records in the activity record data stream 114 to produce a content concept identifier associated with the image content.

Based on the inputs from the activity record data stream 114, the analytic services 118 can each produce an application service output stream (e.g., an application service output stream 122A or an application service output stream 122B, collectively as the "application service output streams 122"). For example, the application service output stream 122A provides derivative data records that correspond to the activity records with analyzable content.

The stream consolidation engine 102 can be implemented on a computer server system of the social networking system 100. The stream consolidation engine 102 subscribes to the activity record data stream 114 and the application service output streams 122. The stream consolidation engine 102 can generate a single consolidated data stream 124 based on a variety of inputs and transformations. The stream consolidation engine 102 can merge the activity record data stream 114 with one or more of the application service output streams 122. The stream consolidation engine 102 can fold one or more activity records together from the activity record data stream 114 when the activity records pertain to the same activity or are otherwise tightly related in some manner. The merging and folding can result in the generation of one or more conglomerate data records in the single consolidated data stream 124. The stream consolidation engine 102 can augment the conglomerate data records in the single consolidated data stream 124 by querying information from one or more data storages 126 of the social networking system 100. For example, the stream consolidation engine 102 can add additional data fields to the conglomerate data records or at additional entries into an existing data field in the conglomerate data records.

For example, the data storages 126 includes a social graph 128, a data cache 132, a user profile database 136, or any combination thereof. For example, the social graph 128 can be stored in the edge store 718 of FIG. 7. The social graph 128 stores social network connections between one or more social network objects (e.g., user accounts, social network pages, social network groups, social network topics, or any combination thereof). The social network connections can be explicit connections or implicit connections. The data cache 132 provides temporary data storage for application services of the social networking system 100. For example, the data cache 132 can cache (e.g., store) information (e.g., geographical location, login status, traveling status, or any combination thereof) associated with a user account. The stored/cached information can be generated by one or more application services. One or more application services can update the data cache 132 irregularly. The information stored in the data cache 132 can be information that does not change frequently but is frequently accessed. The user profile database 136 stores profile information (e.g., gender, occupation, relationship status, birthday, birth country, other preferences, or any combination thereof) specified by the user accounts of the social networking system 100. The stream consolidation engine 102 can add data entries or data fields to the single consolidated data stream 124 based on the social network connections, the cached information, the profile information, or any combination thereof.

A real-time chatter analysis engine 140 can subscribe to the single consolidated data stream 124. The real-time chatter analysis engine 140 is a system platform that enables analyst users (e.g., data scientists) to customize data mining studies (e.g., a data mining study 144A, a data mining study 144B, etc., collectively as the "data mining studies 144") in the social networking system 100. The data mining studies 144 can each include machine intelligence logic (e.g., statistical analysis, classification analysis, natural language processing analysis, the anomaly analysis, etc.) to analyze the content (e.g., representative of digital chatter) from at least a portion of the single consolidated data stream 124.

As an example, the data mining studies 144 can include comparative studies between types of user activities, types of users (e.g., who performed the user activities), or other attributes in the activity records. In other examples, the data mining studies 144 can include content topic analysis (e.g., meme analysis), virality analysis, demographic distribution analysis, or any combination thereof. Other examples are shown in the chatter insight interface of FIG. 6.

In several embodiments, the real-time chatter analysis engine 140 can store and maintain groups of content concept identifiers where each group corresponds to one of the data mining studies 144. The real-time chatter analysis engine 140 can filter away activity records in the single consolidated data stream 124 that do not match any of the concept content identifiers. An activity record that come in through the single consolidated data stream 124 the matches at least one content identifier within a group is routed to the corresponding data mining study for analysis.

The content concept identifiers are ways of identifying content (e.g., user-generated digital chatter) as being related to a central theme. Content concept identifiers can include, for example, topic tags, hashtags, and/or term objects. In some embodiments, a topic tag is represented as a social network page. A hashtag is a word that may be found within user-generated content denoting an authoring user's intention for the content to be part of a topic or theme. A hashtag can have a known prefix or suffix (e.g., typically a prefix of the pound symbol "#"). A hashtag can be represented as a social network object. A term object can be a text string comprised of two or more consecutive words.

User-generated content can be associated with a topic tag based on a topic inference engine (e.g., the topic tagger engine 734 of FIG. 7) or based on user indication (e.g., an explicit mention in a post or a status update). A topic tag can be a reference to a social network page. The topic tag can be associated with a content object in one or more ways. In one example, a social networking system can implement a topic inference module that infers topics based on content items in user-generated content. For example, U.S. patent application Ser. No. 13/589,693, entitled "Providing Content Using Inferred Topics Extracted from Communications in a Social Networking System" discloses a way to infer interests based on extracted topics from content items in a social networking system. In another example, an authoring user of a content object can associate the topic tag with the content object that the authoring user creates. For example, this association can occur by an explicit reference to a social networking page in a user post (e.g., a social network "mention") or an explicit reference in a status update or minutia. In some cases, a user visiting a social network object can make the topic tag.

A hash tag is an example of a content concept identifier that associates with content based on the authoring user of the content. A hashtag is a word or phrase preceded by a hash or pound sign ("#") to identify messages relating to a specific topic. The authoring user can insert the hashtag in a piece of content he or she generates. For example, a hashtag can appear in any user-generated content of social media platforms, such as the social networking system 702 of FIG. 7.

A term object is a set of words (e.g., bigrams, trigrams, etc.) that may be tracked by the social networking system. In some embodiments, while the topic tag is associated with a social network page in a social graph of the social networking system, a term object is not part of the social graph. In these embodiments, term objects can be tracked in user-generated content by the real-time chatter analysis engine 140 once the term objects are explicitly defined.

In some cases, a content concept identifier may be associated with other content concept identifiers according to a grouping of known similar concepts in the social networking system 100. For example, a social networking system can implement a system to cluster social network pages having the same or substantially similar title or description and select one of the social network pages and its associated topic tag as the canonical topic tag associated with the title or description. A content concept identifier that references a canonical topic tag can reference multiple social network pages within that cluster corresponding to the canonical topic tag. For example, U.S. patent application Ser. No. 13/295,000, entitled "Determining a Community Page for a Concept in a Social Networking System" discloses a way for equivalent concepts expressed across multiple domains to be matched and associated with a metapage generated by a social networking system.

Unlike a batch chatter analysis engine 148, the real-time chatter analysis engine 140 enables the data mining studies 144 to compute results of the data mining studies in substantially real-time (e.g., within a minute) or near-real-time (e.g., with minutes to tens of minutes). The real-time chatter analysis engine 140 advantageously uses the single consolidated data stream 124 such that the machine intelligence logic of the data mining studies 144 can react (e.g., immediately or substantially immediately) to an unbounded stream of user activities as new activity records come in. For example, the results from the data mining studies 144 can be substantially synchronous to when new activity records become available via the single consolidated data stream 124. In several embodiments, the batch chatter analysis engine 148 executes data mining studies (not shown) that are asynchronous to when new activity records become available. For example, the batch chatter analysis engine 148 can analyze batch activity records in a batch record storage 152. A data container (e.g., a file folder, a file, a storage volume, etc.) storing the batch activity records can have a fixed size.

In several embodiments, the stream consolidation engine 102 consolidates various activity records corresponding to a single content generation event into a single activity record in the single consolidated data stream 124. This consolidation can merge separate streams together, including raw data collected from the client interfacing services 106 and derived from the analytic services 118. This consolidation can augment the activities records with data from the data storages 126. This consolidation can fold two or more activity records corresponding to the same single content generation event and in the same data stream into a single activity record in the single consolidated data stream 124. The stream consolidation engine 102 can include additional analytical components that compute derivative data, in real-time, based on data in the activity records. The stream consolidation engine 102 can add the derivative data into a conglomerate data record in the single consolidated data stream 124.

The data consolidation provided by the stream consolidation engine 102 enables data mining studies 144 to rely on the assumption that each activity record corresponds to a single content generation event, and thus enabling the data mining studies 144 to more accurately account for digital chatter occurring within the social networking system 100. This premise ensures the accuracy of the digital chatter analysis performed by the data mining studies 144. The stream consolidation engine 102 expands the number of data fields and/or the number of data entries in each conglomerate data record of the single consolidated data stream 124. In several embodiments, each conglomerate data record directly provides attributes and content characterizing an entity activity in the social networking system 100 without requiring a data mining logic to traverse data references or links.

The stream consolidation engine 102 thus can provide a computational tool for the field of data mining that cannot be replaced by mere mental activities or human pen and paper activities. These specific steps cannot be performed entirely within a human mind because of their complexity, bandwidth requirements and service level objective (SLO) requirements. The specific steps of merging, augmenting, folding, and adding described above can be implemented in a computing device. However, a general purpose computing device has to be reconfigured to execute the specific steps described above to enable the implementation of the stream consolidation engine 102.

Figure 7:
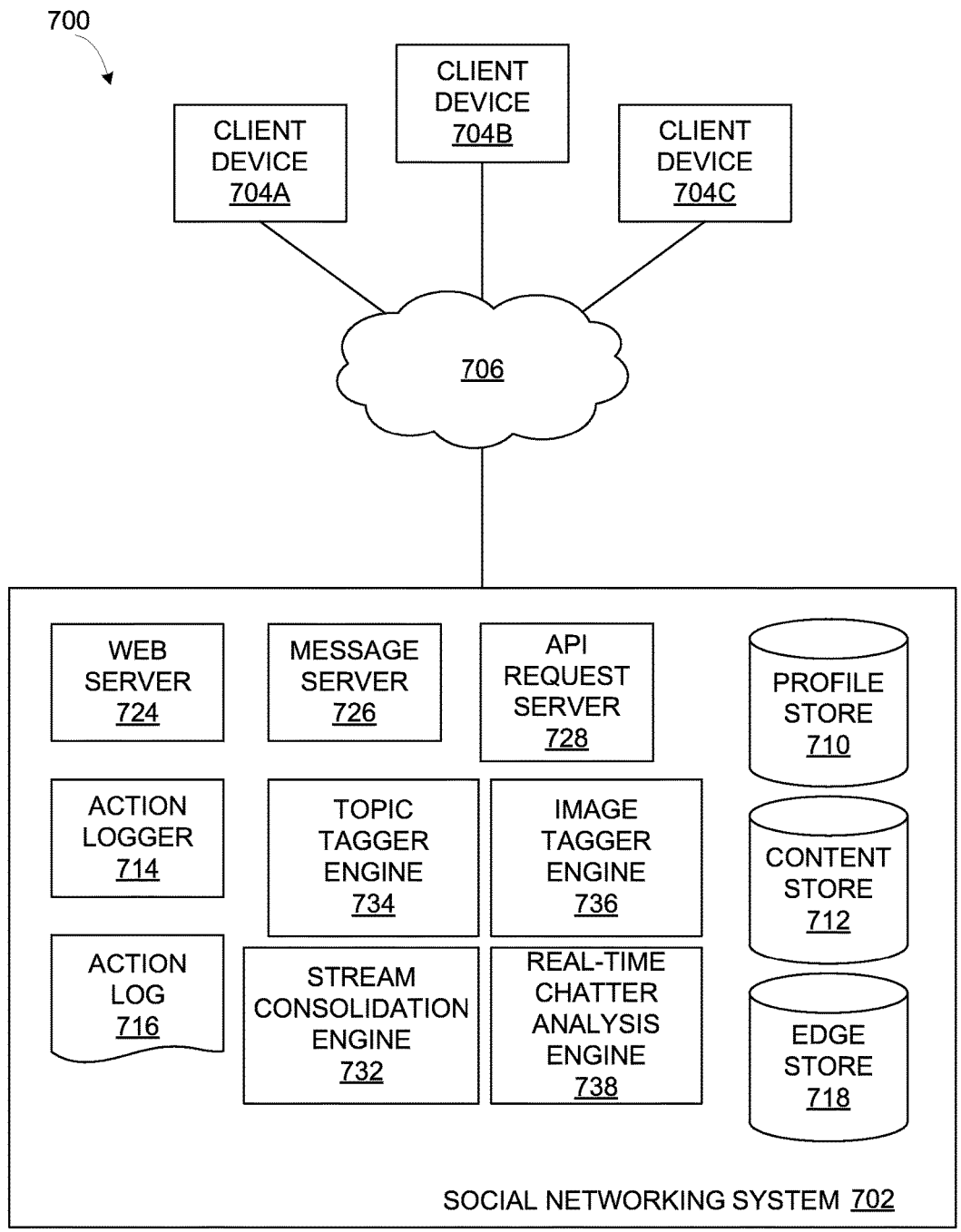
FIG. 7 is a high-level block diagram of a system environment suitable for a social networking system, in accordance with various embodiments.

In some embodiments, one or more objects (e.g., social network objects) of a social networking system (e.g., the social networking system 100 or the social networking system 702 of FIG. 7) may be associated with a privacy setting. The privacy settings (or "access settings") for an object may be stored in any suitable manner, for example, in association with the object or in an index on an authorization server. A privacy setting of an object may specify how the object (or particular information associated with an object) can be accessed (e.g., viewed or shared) using the social networking system. When the privacy settings for an object allow a particular user to access that object, the object may be described as being "visible" with respect to that user.

For example, a user of the social networking system may specify privacy settings for a user-profile page that identify a set of users that may access the work experience information on the user-profile page, thus excluding other users from accessing the information. In some embodiments, the privacy settings may specify a "blocked list" of users that should not be allowed to access certain information associated with the object. In other words, the blocked list may specify one or more users or entities (e.g., groups, companies, application services, etc.) for which an object is not visible. For example, a user may specify a set of users that may not access photos albums associated with the user, thus excluding those users from accessing the photo albums (while also possibly allowing certain users not within the set of users to access the photo albums).

In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the social networking system. For example, a social network object corresponding to a particular photo may have a privacy setting specifying that the photo may only be accessed by users tagged in the photo and their friends. In some embodiments, privacy settings may allow users to opt in or opt out of having their actions logged by social networking system or shared with other systems (e.g., internal or external to the social networking system). In some embodiments, the privacy settings associated with an object may specify any suitable granularity of permitted access or denial of access. For example, access or denial of access may be specified for particular users (e.g., only me, my roommates, and my boss), entities, applications services, groups of entities, users or entities within a particular degrees-of-separation (e.g., friends, or friends-of-friends), user groups (e.g., the gaming club, my family), user networks (e.g., employees of particular employers, students or alumni of particular university), all users ("public"), no users ("private"), users of external systems, particular applications (e.g., third-party applications, external websites, etc.), other suitable users or entities, or any combination thereof. Although this disclosure describes using particular privacy settings in a particular manner, this disclosure contemplates using any suitable privacy settings in any suitable manner.

In some embodiments, one or more servers may be authorization/privacy servers for enforcing privacy settings. In response to a request from a user or an entity for a particular object stored in a data store of the social networking system, the social networking system may send a request to the data store for the object. The request may identify the user or entity associated with the request and may only fulfill the request if the authorization server determines that the user is authorized to access the object based on the privacy settings associated with the object. If the requesting user is not authorized to access the object, the authorization server may prevent the requested object from being retrieved, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Social Networking System Overview

Several embodiments of the social networking system 100 utilize or are part of a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile").

Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

FIG. 2A is a block diagram illustrating an example of a portion of a data stream 200 of user activity records, in accordance with various embodiments. For example, the data stream 200 can be the activity record data stream 114. In various embodiments, an activity logger 202 (e.g., the activity logger 110) generates the data stream 200. For example, the data stream 200 can include an activity record 206A and an activity record 206B. The activity record 206A can be the most recently generated activity record from the activity logger 202. The activity record 206B can be the second most recently generated activity record from the activity logger 202.

The activity record 206A can include at least a record identifier (ID) 210A, an entity ID 214, a record type 218, a timestamp 226, a page ID 228, text content 232, a media content 234, or any combination thereof. The record ID 210A can be a unique or substantially unique ID corresponding to each activity record in the data stream 200. The entity ID 214 can be a unique or substantially unique ID corresponding to each user account or entity account in a social networking system in which the activity logger 202 is implemented. The record type 218 specifies an enumerated type associated with the activity record 206A. In some embodiments, the data stream 200 is a heterogeneous data stream that contains activity records of different types. The record type 218 enables a recipient of the data stream 200 to reference a stored mapping (e.g., a computer data dictionary) to determine the data structure of an activity record (e.g., including the number of data fields in the activity record) and what those data fields correspond to.

For example, the record type 218 can specify a "check-in" activity, where a user (e.g., corresponding to the entity ID 214) publishes in the social networking system that, at the timestamp 226, the user is collocated with an entity represented by the page ID 228. The text content 232 may be associated with a user generated description of the user activity captured by the activity record 206A. The media content 234 may be associated with a user uploaded media content associated with the user activity.

The activity record 206B includes a record ID 210B that is different from the record ID 210A of the activity record 206A. However, the activity record 206B can be related to the activity record 206A. For example, the activity record 206B includes the same entity ID 214. In some embodiments, the activity record 206B includes a parent ID 238 with the same value as the record ID 210A to denote a relationship between them. The parent ID 238 enables a stream consolidation engine (e.g., the stream consolidation engine 102) of the social networking system to determine that the activity record 206B is to be folded into (e.g., joined together with) the activity record 206A. The activity record 206B can include a timestamp 242. The timestamp 242 can have the same value as the timestamp 226. In some embodiments, the stream consolidation engine can determine that the activity record 206B is to be folded into the activity record 206A based on the timestamps 226 and 242 (e.g., being the same or within a threshold range from each other) and/or the shared entity ID 214. The activity record 206B can have a record type 246 that specifies a "location tag" activity type. The activity record 206B can include a location field 248. For example, the location field 248 can be a longitude/latitude coordinate and/or a city/state/country description.

FIG. 2B is a block diagram illustrating an example of a portion of an application service output stream 250, in accordance with various embodiments. For example, the activity logger 202 can feed the data stream 200 into an application service 252 that processes the data stream 200 into the application service output stream 250. In the illustrated example, the application service output stream 250 includes at least a derivative record 256A and a derivative record 256B. The derivative record 256A can be the most recently generated derivative record from the application service 252. The derivative record 256B can be the second most recently generated derivative record from the application service 252.

In the illustrated example, the derivative record 256A includes at least a record ID 260, a parent ID 262, a record type 264, a derivative attribute field 270, a timestamp 274, or any combination thereof. A record ID 260 can uniquely or substantially uniquely identify the derivative record 256A. The parent ID 262 can reference the activity record from which the derivative record 256A is derived. For example, the parent ID 262 can correspond to the record ID 210A, hence identifying the activity record 206A as the corresponding activity record for the derivative record 256A. The record type 264 can be an identifier that specifies the enumerated type of derivative record. The record type 264, similar to the record type 218 or the record type 246, enables a recipient of the application service output stream 250 to determine the data structure of the derivative record 256A. For example, the record type 264 can specify the derivative record 256A as a topic tagger record. In that example, the application service 252 is a topic tagger service. The derivative attribute field 270 can store the one or more derived values computed by the application service 252 in response to processing the activity record 206A. In the example where the derivative record 256A is a topic tagger record, the derivative attribute field 270 can include one or more topic IDs identified by the application service 252. In some embodiments, the derivative record 256A includes the timestamp 274 corresponding to when the derivative record 256A is generated. In some embodiments, the timestamp 274 corresponds to when the activity record 206A corresponding to the derivative record 256A is generated.

In the illustrated example, the derivative record 256B can correspond to another activity record in the data stream 200 that contains or references text content for the application service 252 to analyze. In various embodiments, the application service 252 can be other types of application services, including for example, an image tagger engine.

Figure 3:
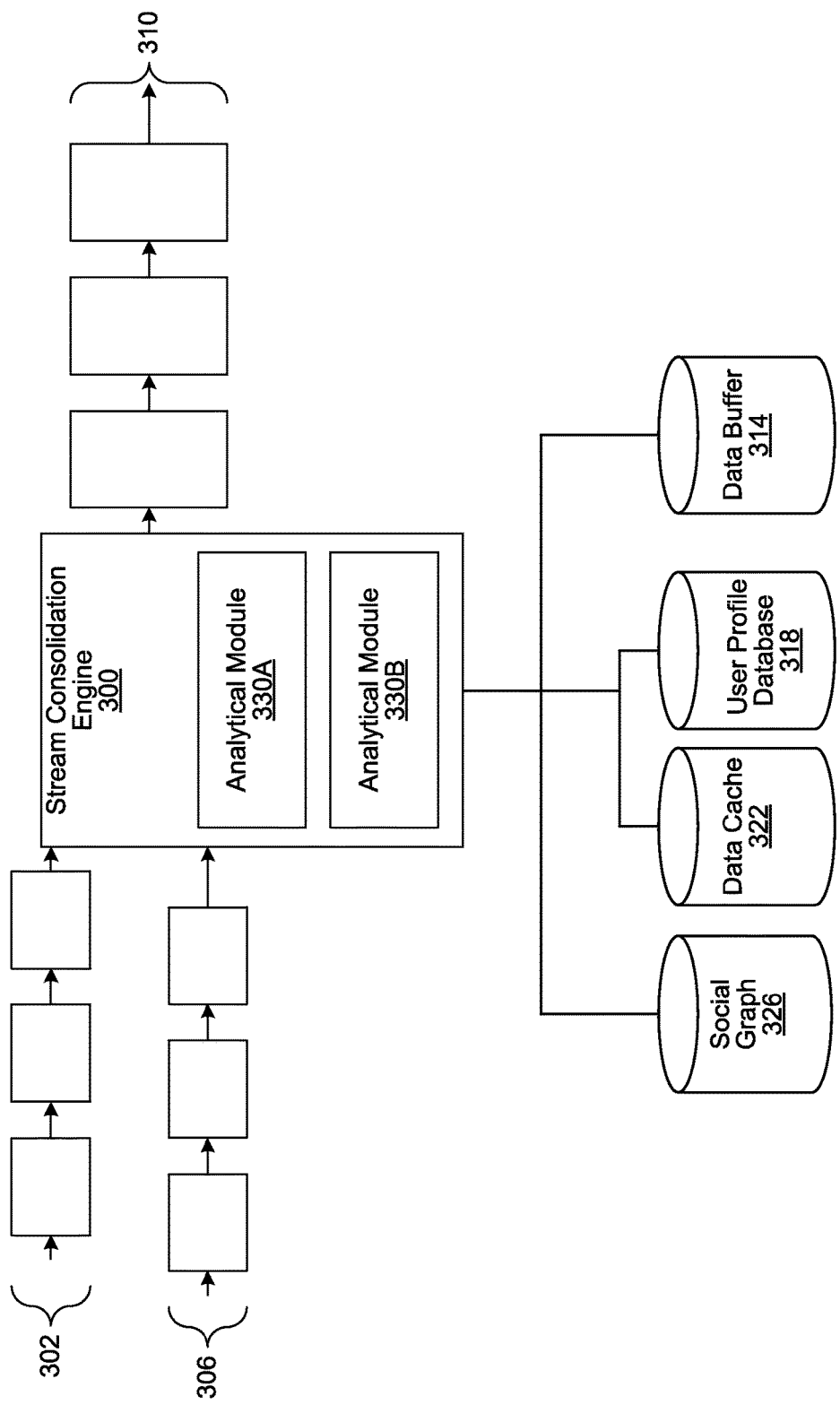
FIG. 3 is a data flow diagram illustrating an operating environment of a stream consolidation engine, in accordance with various embodiments.

FIG. 3 is a data flow diagram illustrating an operating environment of a stream consolidation engine 300, in accordance with various embodiments. The stream consolidation engine 300 can receive, as inputs, one or more input data streams. For example, a heterogeneous record data stream 302 (e.g., the activity record data stream 114 or the data stream 200) can be an input to the stream consolidation engine 300. For another example, a homogeneous record data stream 306 (e.g., one of the application service output streams 122 or the application service output stream 250) can be an input to the stream consolidation engine 300. The stream consolidation engine 300 processes the input data streams to generate a single consolidated data stream 310 (e.g., the single consolidated data stream 124).

The stream consolidation engine 300 can a new record in one of the input data streams. The new record can be referred to as the "initial record." In response to receiving the initial record, the stream consolidation engine 300 can monitor the input data streams for the duration of a waiting period to synchronize data records (e.g., activity records or derivative records) from the same data stream or a different data stream. In some embodiments, the waiting period is a preset amount of time. In some embodiments, the waiting period is configured differently depending on the record type of the initial record. During the waiting period, the stream consolidation engine 300 may receive one or more other data records that reference the "initial record" or that the initial record references. The stream consolidation engine 300 can aggregate one or more data records received during the waiting period into a joinder group, when the data records all fall within a chain or a graph of inter-referencing records (e.g., inter-referencing by using the "parent ID" field). For example, the joinder group can include the initial record, a data record referenced by the initial record, and/or a data record that the initial record references. In some embodiments, the stream consolidation engine 300 also verifies the timestamps of the data records and/or other record fields (e.g., entity ID or page ID) to determine whether to include a subsequent data record into the joinder group. In some embodiments, the stream consolidation engine 300 caches data records in a data buffer 314 as the data records come in through the input data streams. In these embodiments, the stream consolidation engine 300 can check the data buffer 314 for data records received prior to the initial record to determine whether to include any prior record in the joinder group (e.g., by checking whether the prior record is in an inter-referencing chain or graph with the initial record or by checking whether the prior record shares one or more matching data fields with the initial record).

At the end of the waiting period, the stream consolidation engine 300 can merge (e.g., join) the data records in the joinder group into a resulting conglomerate data record. For example, merging of the data records can include concatenating data fields in the data records and removing any duplicative or redundant data fields. The stream consolidation engine 300 can query one or more data stores (e.g., a user profile database 318, a data cache 322, or a social graph 326) to extract information (e.g., that corresponds to an existing data field/entry in the conglomerate data record) to supplement/augment the conglomerate data record (e.g., by adding one or more additional data fields or adding one or more data entries into an existing data field).

In some embodiments, the stream consolidation engine 300 can supplement or augment the conglomerate data record by deriving additional information from the data fields of the conglomerate data record. For example, the stream consolidation engine 300 can include one or more analytical modules (e.g., an analytical module 330A, an analytical module 330B, etc., collectively as the "analytical modules 330"). The analytical modules 330 can perform natural language processing on text content, pattern recognition on text content or media content, correlation analysis between different data fields, metric dimension conversion of a data field, data summarization of various data fields, entity-specific state machine update, activity classification based on one or more data fields, or any combination thereof. When relevant data is available in or referenced by the data fields of the conglomerate data records, the one or more analytical modules 330 can process the relevant data to produce a derivative data entry (e.g., an activity classification, a content summary, a user state, a count, a statistical measure, a prediction, a user characteristic, or any combination thereof). The derivative data entry can be added as a new data field in the conglomerate data record, or as an additional data entry in an existing data field. After merging the various data records in the joinder group and after augmenting or supplementing one or more additional data fields or one or more data entries into existing data fields, the stream consolidation engine 300 can then publish the conglomerate data record (e.g., with any data field augmentations) in the single consolidated data stream 310.

In one example, the stream consolidation engine 300 receives a data record (referred in this example as the "initial record") from the heterogeneous record data stream 302. The initial record can characterize a user post to a social network page. The stream consolidation engine 300 monitors the heterogeneous record data stream 302 and the homogeneous record data stream 306 for the duration of a waiting period. At a later time within the waiting period, the stream consolidation engine 300 receives a second data record from the heterogeneous record data stream 302 that references the initial record. The second data record can be a location update associated with the user post. Accordingly, the stream consolidation engine 300 includes the second data record in the joinder group. The initial record can include a parent ID referencing a third data record. The stream consolidation engine 300 can query the data buffer 314 to identify the third data record received within a preset time range by the stream consolidation engine 300. For example, the third data record can be another user posting that the initial record is re-sharing. Accordingly, the stream consolidation engine 300 includes the third data record in the joinder group. When the waiting period expires, the stream consolidation engine 300 merges (e.g., joins) the initial data record, the second data record, and the third data record into a conglomerate data record.

In the example, the stream consolidation engine 300 can extract historical user location information (e.g., by referencing an entity/user ID in the conglomerate data record) from the data cache 322, and add an additional data field for the user location information into the conglomerate data record. The stream consolidation engine 300 can extract a user age information from the user profile database 318, and add an additional data field for the user age information into the conglomerate data record. The analytical module 330A can analyze the sentiment (e.g., positive or negative) associated with the text content in the conglomerate data record. In response, the stream consolidation engine 300 can add an additional data field for the sentiment information into the conglomerate data record. The analytical module 330B can use heuristic rules to determine a concept topic associated with the media content or the text content of the conglomerate data record, even when the conglomerate data record already has a data field associated with topic IDs. In this case, the stream consolidation engine 300 can add the output of the analytical module 330B as an additional entry to the topic ID field.

Figure 4:
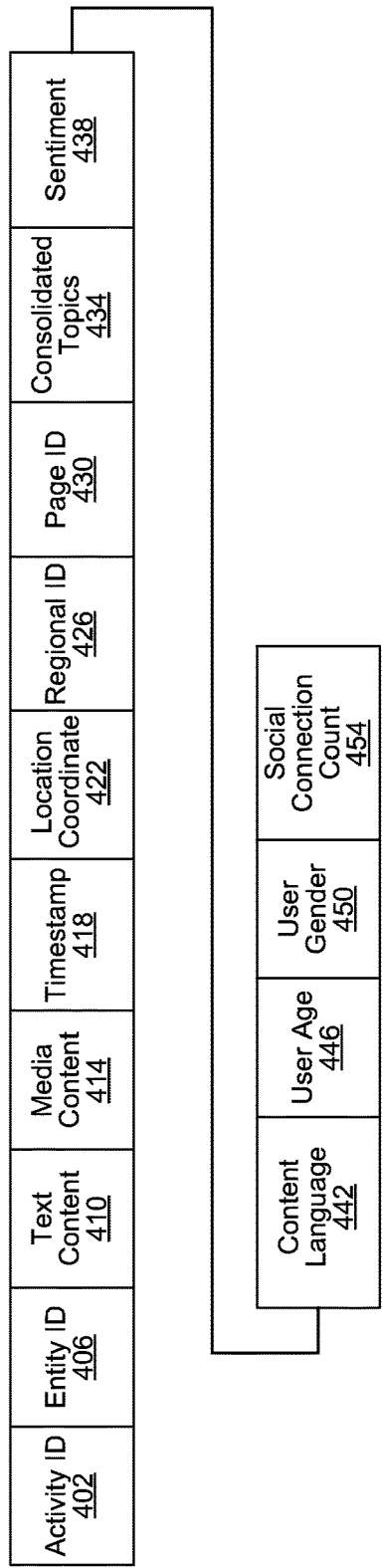
FIG. 4 is a data structure diagram illustrating an example of a conglomerate data record in a consolidated data stream, in accordance with various embodiments.

FIG. 4 is a data structure diagram illustrating an example of a conglomerate data record 400 in a consolidated data stream, in accordance with various embodiments. The consolidated data stream 400 includes at least a record ID 402, an entity ID 406, text content 410, media content 414, timestamp 418, a location coordinate 422, a regional ID 426, a page ID 430, a consolidated topics 434, content sentiment 438, a content language 442, a user age 446, a user gender 450, a user social connection count 454, or any combination thereof. The record ID 402 can be a data field that stores one or more of the record IDs (e.g., the record ID 210A and the record ID 210B, and the record ID 260) that is part of the conglomerate data record 400. The entity ID 406, the text content 410, the media content 414, the timestamp 418, and page ID 430 can respectively correspond to the entity ID 214, the text content 232, the media content 234, the timestamp 226, and the page ID 228 from an initial record that sourced at least part of the conglomerate data record 400.

The location coordinate 422 can specify the longitude and latitude coordinate associated with the user activity described by the conglomerate data record 400. The location coordinate 422 can be sourced from a second data record that is joined together with the initial record. The regional ID 426 can specify a country or a region associated with the user activity or the user account (e.g., identified by the entity ID 406). For example, a stream consolidation engine can determine the regional ID 426 when the location coordinate 422 is known by querying a geography database or other data storage.

The consolidated topics 434 include one or more topic IDs (e.g., content concept identifiers) generated by one or more application services (e.g., an image tagger engine or a topic tagger engine). The stream consolidation engine can merge the application service output streams of the image tagger service and the topic tagger service such that the generated topic IDs are included in the data field of the consolidated topics 434. The stream consolidation engine can run its own analytical modules to compute the content sentiment 438 and/or the content language 442 and include these data fields in the conglomerate data record. For example, the content sentiment 438 specifies whether the text content 410 has a positive sentiment or a negative sentiment. An analytical module can utilize natural language processing and/or a dictionary of positive and negative terms to determine the content sentiment 438. The content language 442 is the result of a determination of what language is used to compose the text content 410.

The user age 446, the user gender 450, and the user social connection count 454 are attributes of a user account associated with the entity ID 406 that can be extracted from one or more data storages of a social networking system. These attributes can be asynchronous information that the stream consolidation engine supplements into the conglomerate data record 400.

Figure 5:
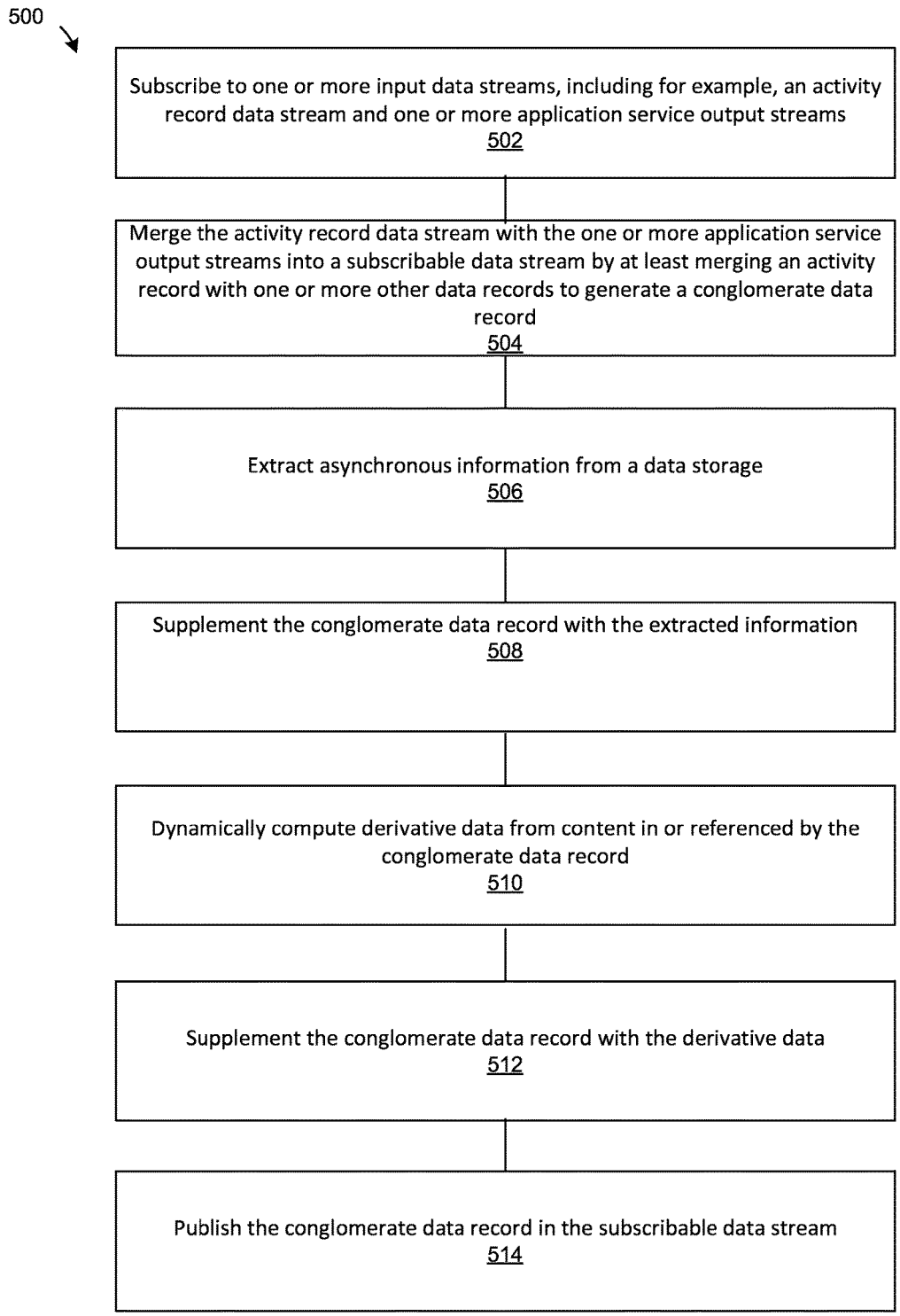
FIG. 5 is a flow chart illustrating a method of operating a stream consolidation engine in a social networking system, in accordance with various embodiments.

FIG. 5 is a flow chart illustrating a method of operating a stream consolidation engine (e.g., the stream consolidation engine 102 and/or the stream consolidation engine 300) in a social networking system (e.g., the social networking system 100 of FIG. 1 or the social networking system 702 of FIG. 7), in accordance with various embodiments. The stream consolidation engine can be part of the social networking system or run on a separate computer server system.

At block 502, the stream consolidation engine can subscribe to one or more input data streams, including for example, an activity record data stream and one or more application service output streams. Each input data stream can be open-ended sequence of data records. An activity logger can generate the activity record data stream. The activity record data stream can be a heterogeneous data stream containing activity records of different types (e.g., different data structures and/or different data fields). In some embodiments, the stream consolidation engine can filter the activity record data stream to keep only activity records that have media or text content (e.g., remove activity records that have no media or text content). One or more application services of the social networking system can generate the application service output streams. For example, an activity logger can pipe the activity log data stream to the one or more application services. When an input activity record provides relevant information to an application service, the application service can generate a derivative record based on the input activity record and pipe the derivative record through an application service output stream. For example, the application service determines relevant information is present if the new activity record includes or references text and/or media content and/or includes a specified data field.

At block 504, the stream consolidation engine can merge the activity record data stream with the one or more application service output streams into a subscribable data stream. The stream consolidation engine can merge an activity record (e.g., a most recent activity record in one of the input data streams) with one or more other data records (e.g., in one of the input data streams) to generate a conglomerate data record. The stream consolidation engine can implement a synchronization period during which the stream consolidation engine selects the group of data records for merging. The stream consolidation engine can select a group of data records from one or more of the input data streams to be merged. The selection of the group can be based on whether the data records references each other (e.g., via the "parent ID" data field). The selection of the group can be based on the data records having matching timestamps, entity identifiers, record identifiers, or any combination thereof. In some embodiments, the stream consolidation engine can implement conditional joint logic, wherein two data records is merged only when specific conditions related to one or more data fields of the data records are met.

At block 506, the stream consolidation engine can extract asynchronous information from a data storage. Asynchronous information is information that is available prior to a timestamp of the conglomerate data record. The asynchronous information can correspond to a data field in the conglomerate data record. For example, the asynchronous information can be user profile information corresponding to an entity/user ID in the activity record. The data storage can be a data cache or a database. In some embodiments, the data storage is a key-value data cache and the stream consolidation engine can extract the asynchronous information by querying the key-value data cache using the data field as the input key. At block 508, the stream consolidation engine can supplement the conglomerate data record with the extracted information. Supplementing the conglomerate data record can include adding the extracted asynchronous information as a new data field or a new data entry within an existing data field of the conglomerate data record. At block 510, the stream consolidation engine can dynamically compute derivative data from content in or referenced by the conglomerate data record. The derivative data can be computed is response to creating the conglomerate data record. At block 512, the stream consolidation engine can supplement the conglomerate data record with the derivative data.

At block 514, the stream consolidation engine can publish the conglomerate data record in the subscribable data stream subscribed by a real-time chatter analysis engine (e.g., the real-time chatter analysis engine 140). The real-time chatter analysis engine can implement a subscription interface for one or more digital chatter studies (e.g., the data mining studies 144). The real-time chatter analysis engine can re-route at least portions of conglomerate data records from the subscribable data stream to study-specific logic modules. For example, each digital chatter study can correspond to a list of content concept identifiers. The real-time chatter analysis engine can select a portion of the conglomerate data records for a digital chatter study based on the content concept identifiers corresponding to the digital chatter study. The real-time chatter analysis engine can generate a real-time dashboard that reflects dynamically updated insights to digital chatter (e.g., specific to a digital chatter study) occurring in real time within the social networking system.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation. A process step is "in response to" to another process step when the process step is a direct reaction to the completion of the other process step.

Figure 6:
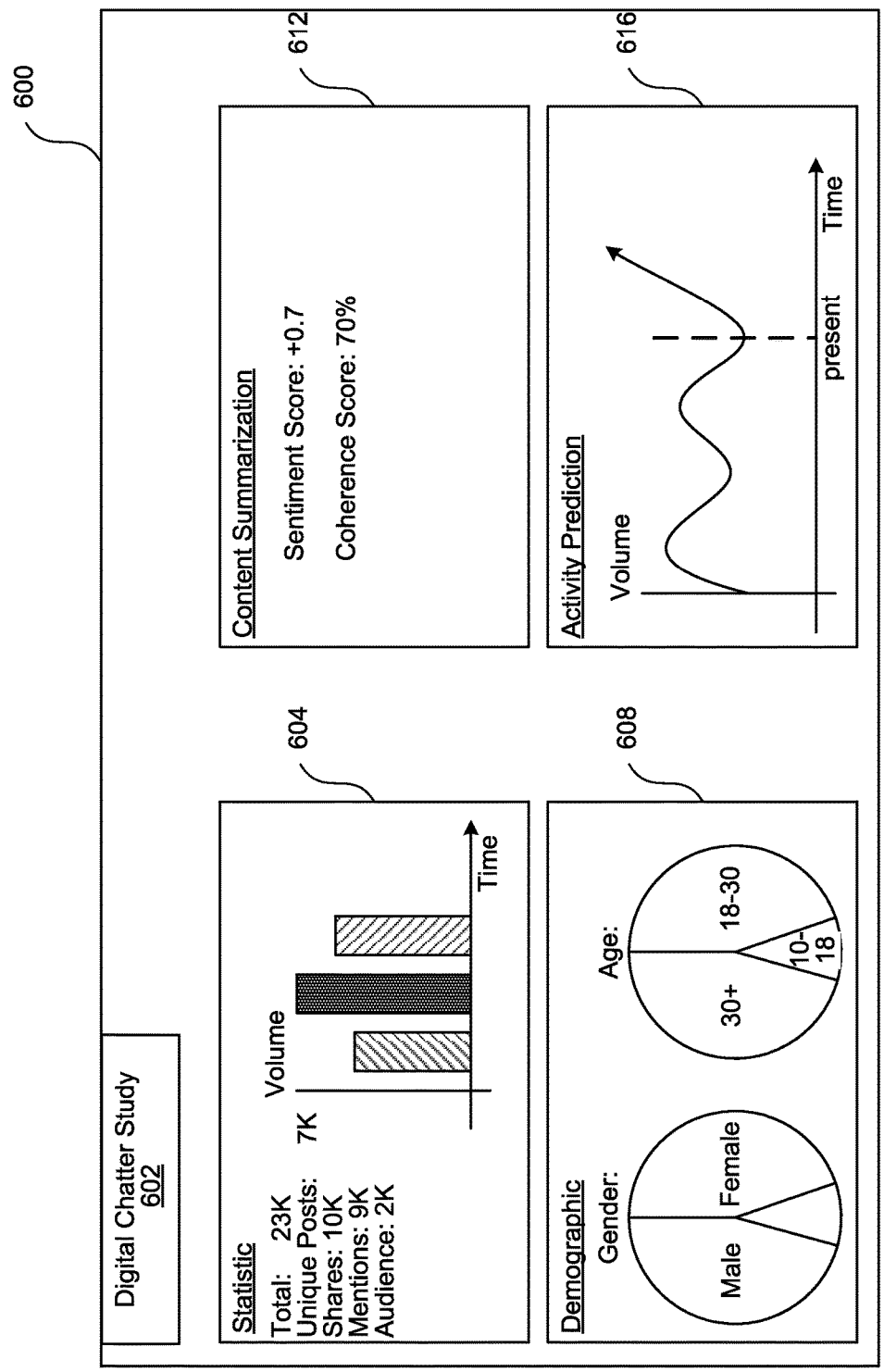
FIG. 6 is an example of a chatter insight interface displaying a real-time insight window, in accordance with various embodiments.

FIG. 6 is an example of a chatter insight interface displaying a real-time insight window 600, in accordance with various embodiments. The real-time insight window 600 can specify a chatter study 602 (e.g., the one of the data mining studies 144) indicating the name of a data mining study that is analyzing the digital chatter of a social networking system (e.g., the social networking system 100) in real time. The chatter study 602 specifies the subject matter of the real-time insight window 600. The chatter study 602 can subscribe to a consolidated data stream. The consolidated data stream can be filtered to select activity records matching a list of content concept identifiers associated with the chatter study 602.

The real-time insight window 600 can include a chatter statistic panel 604 that illustrates statistics of digital chatter relevant to the chatter study 602. For example, the chatter statistic panel 604 can display types of digital chatter (e.g., the activity records) that are being analyzed in the chatter study 602. The chatter statistic panel 604 can display the total number of digital chatter analyzed. The chatter statistic panel 604 can display the total number of user accounts/entities involved in the digital chatter analyzed.

In some embodiments, the real-time insight window 600 can include a demographic panel 608 that includes statistics involving the user accounts associated with the digital chatter being analyzed. The demographic panel 608 can include absolute counts of different categories of the user accounts or proportional distributions (e.g., percentages) of the different categories. In the illustrated example, the demographic panel 608 includes a visualization showing the gender distribution of the user accounts and a visualization showing the age distribution of the user accounts.

In some embodiments, the real-time insight window 600 can include a content summarization panel 612 that includes insights from analyzing content (e.g. textual content, image content, audio content, video content, or other multimedia content) in the digital chatter. The content summarization panel 612 can present a common sentiment (e.g., a rating of a positive sentiment or a negative sentiment) from the digital chatter. The content summarization panel 612 can also present a measure of the coherence of the sentiments or key terms present in the digital chatter (e.g., how often do the activity records include the same key terms or have the same sentiment).

In some embodiments, the real-time insight window 600 can include a prediction panel 616 that includes a computed estimate of how certain characteristics of the digital chatter relevant to the chatter study 602 would evolve (e.g., would change going forward). For example, the prediction panel 616 can display a graph showing historical evolution of a statistical measure (e.g., volume of digital chatter) associated with the chatter study 602 and the projected trend of the statistical measure in the near future.

FIG. 7 is a high-level block diagram of a system environment 700 suitable for a social networking system 702, in accordance with various embodiments. The system environment 700 shown in FIG. 7 includes the social networking system 702 (e.g., the social networking system 100 of FIG. 1), a client device 704A, and a network channel 706. The system environment 700 can include other client devices as well, e.g., a client device 704B and a client device 704C. In other embodiments, the system environment 700 may include different and/or additional components than those shown by FIG. 7. The stream consolidation engine 300 of FIG. 3 can be implemented in the social networking system 702.

Social Networking System Environment and Architecture

The social networking system 702, further described below, comprises one or more computing devices storing user profiles associated with users (i.e., social networking accounts) and/or other objects as well as connections between users and other users and/or objects. Users join the social networking system 702 and then add connections to other users or objects of the social networking system to which they desire to be connected. Users of the social networking system 702 may be individuals or entities, e.g., businesses, organizations, universities, manufacturers, etc. The social networking system 702 enables its users to interact with each other as well as with other objects maintained by the social networking system 702. In some embodiments, the social networking system 702 enables users to interact with third-party websites and a financial account provider.

Based on stored data about users, objects and connections between users and/or objects, the social networking system 702 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 702 adds and/or modifies edges connecting the various nodes to reflect the interactions.

The client device 704A is a computing device capable of receiving user input as well as transmitting and/or receiving data via the network channel 706. In at least one embodiment, the client device 704A is a conventional computer system, e.g., a desktop or laptop computer. In another embodiment, the client device 704A may be a device having computer functionality, e.g., a personal digital assistant (PDA), mobile telephone, a tablet, a smart-phone or similar device. In yet another embodiment, the client device 704A can be a virtualized desktop running on a cloud computing service. The client device 704A is configured to communicate with the social networking system 702 via a network channel 706 (e.g., an intranet or the Internet). In at least one embodiment, the client device 704A executes an application enabling a user of the client device 704A to interact with the social networking system 702. For example, the client device 704A executes a browser application to enable interaction between the client device 704A and the social networking system 702 via the network channel 706. In another embodiment, the client device 704A interacts with the social networking system 702 through an application programming interface (API) that runs on the native operating system of the client device 704A, e.g., IOS® or ANDROID™.

The client device 704A is configured to communicate via the network channel 706, which may comprise any combination of local area and/or wide area networks, using both wired and wireless communication systems. In at least one embodiment, the network channel 706 uses standard communications technologies and/or protocols. Thus, the network channel 706 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 706 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 706 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 702 includes a profile store 710, a content store 712, an action logger 714, an action log 716, an edge store 718, a web server 724, a message server 726, an application service interface (API) request server 728, a stream consolidation engine 732, a topic tagger engine 734, an image tagger engine 736, a real-time chatter analysis engine 738, or any combination thereof. In other embodiments, the social networking system 702 may include additional, fewer, or different modules for various applications.

User of the social networking system 702 can be associated with a user profile, which is stored in the profile store 710. The user profile is associated with a social networking account. A user profile includes declarative information about the user that was explicitly shared by the user, and may include profile information inferred by the social networking system 702. In some embodiments, a user profile includes multiple data fields, each data field describing one or more attributes of the corresponding user of the social networking system 702. The user profile information stored in the profile store 710 describes the users of the social networking system 702, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 702 displayed in an image. A user profile in the profile store 710 may also maintain references to actions by the corresponding user performed on content items (e.g., items in the content store 712) and stored in the edge store 718 or the action log 716.

A user profile may be associated with one or more financial accounts, enabling the user profile to include data retrieved from or derived from a financial account. In some embodiments, information from the financial account is stored in the profile store 710. In other embodiments, it may be stored in an external store.

A user may specify one or more privacy settings, which are stored in the user profile, that limit information shared through the social networking system 702. For example, a privacy setting limits access to cache appliances associated with users of the social networking system 702.

The content store 712 stores content items (e.g., images, videos, or audio files) associated with a user profile. The content store 712 can also store references to content items that are stored in an external storage or external system. Content items from the content store 712 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 702. Examples of social networking content items include suggested connections or suggestions to perform other actions, media provided to, or maintained by, the social networking system 702 (e.g., pictures or videos), status messages or links posted by users to the social networking system, events, groups, pages (e.g., representing an organization or commercial entity), and any other content provided by, or accessible via, the social networking system.

The content store 712 also includes one or more pages associated with entities having user profiles in the profile store 710. An entity can be a non-individual user of the social networking system 702, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 712, enabling social networking system users to more easily interact with the vendor via the social networking system 702. A vendor identifier is associated with a vendor's page, thereby enabling the social networking system 702 to identify the vendor and/or to retrieve additional information about the vendor from the profile store 710, the action log 716 or from any other suitable source using the vendor identifier. In some embodiments, the content store 712 may also store one or more targeting criteria associated with stored objects and identifying one or more characteristics of a user to which the object is eligible to be presented.

The action logger 714 receives communications about user actions on and/or off the social networking system 702, populating the action log 716 with information about user actions. Such actions may include, for example, adding a connection to another user, sending a message to another user, uploading an image, reading a message from another user, viewing content associated with another user, attending an event posted by another user, among others. In some embodiments, the action logger 714 receives, subject to one or more privacy settings, content interaction activities associated with a user. In addition, a number of actions described in connection with other objects are directed at particular users, so these actions are associated with those users as well. These actions are stored in the action log 716.

In accordance with various embodiments, the action logger 714 is capable of receiving communications from the web server 724 about user actions on and/or off the social networking system 702. The action logger 714 populates the action log 716 with information about user actions to track them. This information may be subject to privacy settings associated with the user. Any action that a particular user takes with respect to another user is associated with each user's profile, through information maintained in a database or other data repository, e.g., the action log 716. Such actions may include, for example, adding a connection to the other user, sending a message to the other user, reading a message from the other user, viewing content associated with the other user, attending an event posted by another user, being tagged in photos with another user, liking an entity, etc.

The action log 716 may be used by the social networking system 702 to track user actions on the social networking system 702, as well as external website that communicate information to the social networking system 702. Users may interact with various objects on the social networking system 702, including commenting on posts, sharing links, and checking-in to physical locations via a mobile device, accessing content items in a sequence or other interactions. Information describing these actions is stored in the action log 716. Additional examples of interactions with objects on the social networking system 702 included in the action log 716 include commenting on a photo album, communications between users, becoming a fan of a musician, adding an event to a calendar, joining a groups, becoming a fan of a brand page, creating an event, authorizing an application, using an application and engaging in a transaction. Additionally, the action log 716 records a user's interactions with advertisements on the social networking system 702 as well as applications operating on the social networking system 702. In some embodiments, data from the action log 716 is used to infer interests or preferences of the user, augmenting the interests included in the user profile, and enabling a more complete understanding of user preferences.

Further, user actions that happened in particular context, e.g., when the user was shown or was seen accessing particular content on the social networking system 702, can be captured along with the particular context and logged. For example, a particular user could be shown/not-shown information regarding candidate users every time the particular user accessed the social networking system 702 for a fixed period of time. Any actions taken by the user during this period of time are logged along with the context information (i.e., candidate users were provided/not provided to the particular user) and are recorded in the action log 716. In addition, a number of actions described below in connection with other objects are directed at particular users, so these actions are associated with those users as well.

The action log 716 may also store user actions taken on external websites services associated with the user. The action log 716 records data about these users, including viewing histories, advertisements that were engaged, purchases or rentals made, and other patterns from content requests and/or content interactions.

In some embodiments, the edge store 718 stores the information describing connections between users and other objects on the social networking system 702 in edge objects. The edge store 718 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 702, e.g., expressing interest in a page or a content item on the social networking system, sharing a link with other users of the social networking system, and commenting on posts made by other users of the social networking system. The edge store 718 stores edge objects that include information about the edge, e.g., affinity scores for objects, interests, and other users. Affinity scores may be computed by the social networking system 702 over time to approximate a user's affinity for an object, interest, and other users in the social networking system 702 based on the actions performed by the user. Multiple interactions of the same type between a user and a specific object may be stored in one edge object in the edge store 718, in at least one embodiment. In some embodiments, connections between users may be stored in the profile store 710. In some embodiments, the profile store 710 may reference or be referenced by the edge store 718 to determine connections between users. Users may select from predefined types of connections, or define their own connection types as needed.

The web server 724 links the social networking system 702 via a network to one or more client devices; the web server 724 serves web pages, as well as other web-related content, e.g., Java, Flash, XML, and so forth. The web server 724 may communicate with the message server 726 that provides the functionality of receiving and routing messages between the social networking system 702 and client devices. The messages processed by the message server 726 can be instant messages, email messages, text and SMS (short message service) messages, photos, or any other suitable messaging technique. In some embodiments, a message sent by a user to another user can be viewed by other users of the social networking system 702, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 728 enables external systems to access information from the social networking system 702 by calling APIs. The information provided by the social network may include user profile information or the connection information of users as determined by their individual privacy settings. For example, a system interested in predicting the probability of users forming a connection within a social networking system may send an API request to the social networking system 702 via a network. The API request server 728 of the social networking system 702 receives the API request. The API request server 728 processes the request by determining the appropriate response, which is then communicated back to the requesting system via a network.

The stream consolidation engine 732 can be the stream consolidation engine 102 of FIG. 1 or the stream consolidation engine 300 of FIG. 3. The stream consolidation engine 732 can consolidate data streams in the social networking system 702 into a consolidated data stream augmented with asynchronous data and/or dynamically computed derivative data. The consolidated data stream can enable analyst users to define, modify, track, execute, compare, analyze, evaluate, and/or deploy one or more digital chatter studies. The real-time chatter analysis engine 738 can classify user activities (e.g., represented by conglomerate data records in the consolidated data stream) in the social networking system 702 as being relevant to at least one digital chatter study. A digital chatter can further analyze these conglomerate data records to data mine insights in real-time for presentation in the dashboard.

The topic tagger engine 734 can analyze text strings within the content objects in the content store 712 to produce a reference to a social network page. The image tagger engine 736 can analyze multimedia objects within the content objects in the content store 712 to produce a reference to a social network page. The real-time chatter analysis engine 738 can make use of the references (e.g., topic tags) produced from the topic tagger engine 734 or the image tagger engine 736 to filter user activities for digital chatter studies.

Functional components (e.g., circuits, devices, engines, modules, and data storages, etc.) associated with the social networking system 100, the stream consolidation engine 300, and/or the social networking system 702, can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 8:
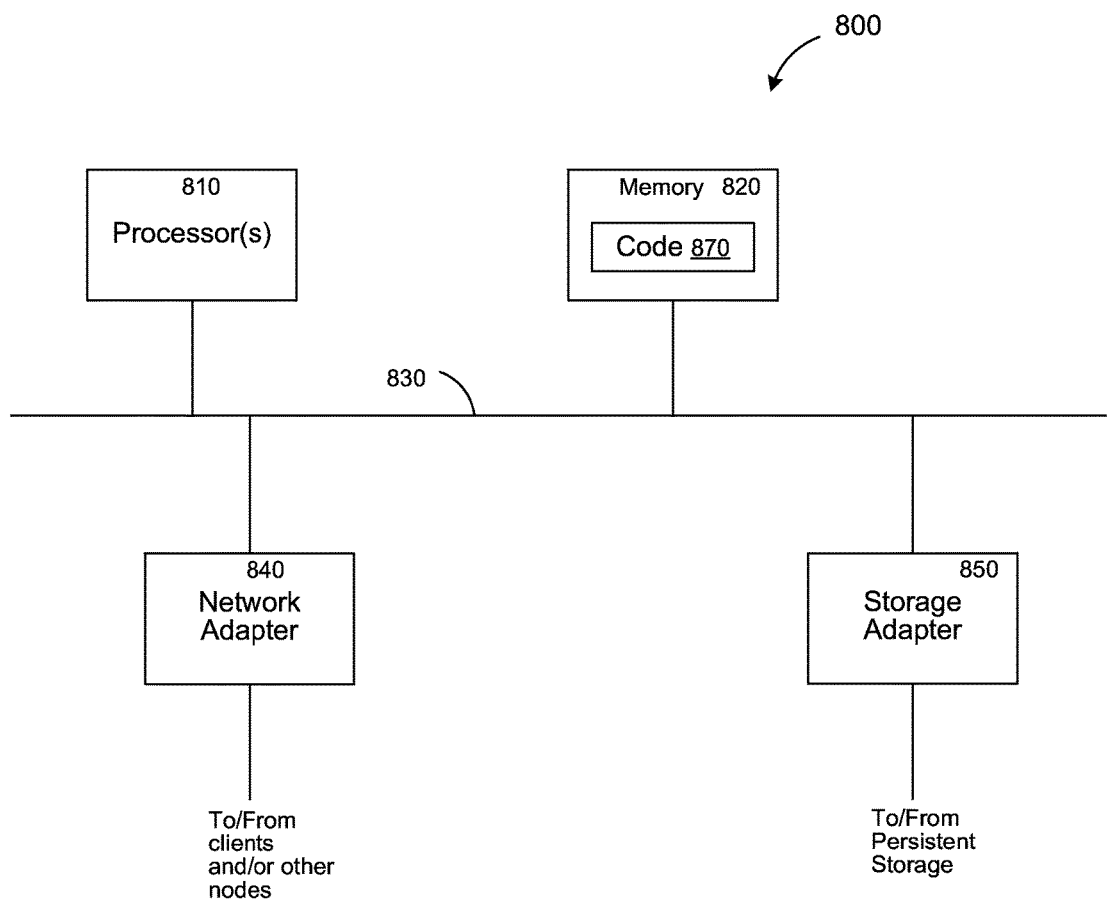
FIG. 8 is a block diagram of an example of a computing device, which may represent one or more computing device or server described herein, in accordance with various embodiments.

FIG. 8 is a block diagram of an example of a computing device 800, which may represent one or more computing device or server described herein, in accordance with various embodiments. The computing device 800 can be one or more computing devices that implement the social networking system 100 of FIG. 1 and/or the stream consolidation engine 300 of FIG. 3, partially or completely. The computing device 800 can execute at least part of the method 500 of FIG. 5. The computing device 800 includes one or more processors 810 and memory 820 coupled to an interconnect 830. The interconnect 830 shown in FIG. 8 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computing device 800 and thus controls the overall operation of the computing device 800. In certain embodiments, the processor(s) 810 accomplishes this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computing device 800. The memory 820 represents any form of random access memory (RAM), read-only memory (ROM), flash memory, or the like, or a combination of such devices. In use, the memory 820 may contain a code 870 containing instructions according to the social networking system(s) disclosed herein.

Also connected to the processor(s) 810 through the interconnect 830 are a network adapter 840 and a storage adapter 850. The network adapter 840 provides the computing device 800 with the ability to communicate with remote devices, over a network and may be, for example, an Ethernet adapter or Fibre Channel adapter. The network adapter 840 may also provide the computing device 800 with the ability to communicate with other computers. The storage adapter 850 enables the computing device 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computing device 800 by downloading it from a remote system through the computing device 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc. The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
   receiving two or more input data streams from a networking system,
   wherein the two or more input data streams include an activity record data stream and an application service output stream;
   monitoring the two or more input data streams in order to identify a data record to merge with an activity record during a preset synchronization period starting from when the activity record is received;
   merging the activity record from the activity record data stream with the data record from the two or more input data streams to create a conglomerate data record;
   extracting asynchronous information from a data storage device, wherein the asynchronous information corresponds to the activity record and is generated prior to a timestamp of the activity record;
   supplementing the conglomerate data record with the extracted asynchronous information; and
   publishing the conglomerate data record in a consolidated data stream.

2. The computer-implemented method of claim 1, further comprising, prior to said merging, filtering the activity record data stream to remove one or more activity records that have no media or text content.

3. The computer-implemented method of claim 1, further comprising, piping the activity record data stream to an application service to generate the application service output stream.

4. The computer-implemented method of claim 1, wherein the asynchronous information is user profile information.

5. The computer-implemented method of claim 3, further comprising:
   computing, via the application service, derivative data from media or text content in or referenced by the activity record;
   generating a derivative data record containing the computed derivative data; and
   publishing the generated derivative data record in the application service output stream, wherein the derivative data record is the data record merged with the activity record.

6. The computer-implemented method of claim 1, wherein the two or more input data streams are unbounded data streams that are open-ended sequences of data.

7. The computer-implemented method of claim 1, wherein extracting the asynchronous information includes querying a key-value data cache.

8. The computer-implemented method of claim 1, further comprising selecting the data record to merge with the activity record by identifying matching values between corresponding data fields of the activity record and the data record.

9. The computer-implemented method of claim 1, further comprising selecting the data record to merge with the activity record by identifying a reference number or symbol in the data record that references the activity record or a reference number or symbol in the activity record that references the data record.

10. The computer-implemented method of claim 1, wherein the activity record is the most recent activity record in the activity record data stream.

11. The computer-implemented method of claim 1, further comprising:
    computing derivative data from content in or referenced by the conglomerate data record; and
    supplementing the derivative data into the conglomerate data record.

12. The computer-implemented method of claim 11, wherein said supplementing includes inserting the derivative data in an existing data field of the conglomerate data record as a new entry or as a new data field of the conglomerate data record.

13. The computer-implemented method of claim 11, wherein the derivative data indicates overall sentiment of text content in the activity record.

14. The computer-implemented method of claim 1, wherein the activity record data stream is a heterogeneous data stream containing activity records of different data structures, and the data record merged with the activity record is from the activity record data stream and of a different type from the activity record.

15. The computer-implemented method of claim 1, further comprising:
    determining that the activity record or the data record satisfies a preset condition; and
    wherein said merging occurs only when the preset condition is satisfied.

16. A computer readable data memory storing computer-executable instructions that, when executed by a computer system, cause the computer system to perform a computer-implemented method, the instructions comprising:
    instructions for receiving two or more input data streams from a social networking system, wherein the two or more input data streams include an activity record data stream and an application service output stream;
    instructions for merging the activity record data stream and the two or more input data streams into a consolidated data stream by at least merging an activity record from the activity record data stream with a data record from the two or more input data streams to create a conglomerate data record;

instructions for computing derivative data from content in or referenced by the conglomerate data record;

instructions for supplementing the derivative data into the conglomerate data record; and instructions for publishing the conglomerate data record in the consolidated data stream.

17. The computer readable data memory of claim 16, wherein the instructions further comprising:

instructions for piping at least a portion of the consolidated data stream to a chatter analysis engine; and instructions for generating, by the chatter analysis engine, a dashboard dynamically configurable to discover a statistical attribute of digital chatter represented by the consolidated data stream that is occurring in the networking system in real-time.

18. A networking system, comprising:

an application service engine, stored in at least one computer readable data memory and implemented by at least one processor, configured to process an activity record data stream to generate an application service output stream;

a stream consolidation engine, stored in the at least one computer readable data memory and implemented by the at least one processor, configured to:

receive two or more input data streams from the networking system, wherein the two or more input data streams include the activity record data stream and the application service output stream;

merge the activity record data stream and the two or more input data streams into a consolidated data stream by merging an activity record from the activity record data stream with a data record from the two or more input data streams to create a conglomerate data record; and publish the conglomerate data record in the consolidated data stream; and a real-time chatter analysis engine, stored in the at least one computer readable data memory and implemented by the at least one processor, configured to re-route data records in the consolidated data stream to a digital chatter analysis engine according to content concept identifiers in the data records that correspond to content concept identifiers associated with the digital chatter analysis engine.

19. The networking system of claim 18, wherein the application service engine is an image tagger engine configured to analyze subject matter of media content of an activity record or a topic tagger engine configured to analyze subject matter of text content of an activity record.

* * * * *

UNITED STATES PATENT AND TRADEMARK OFFICE
CERTIFICATE OF CORRECTION

PATENT NO. : 10,057,349 B2
APPLICATION NO. : 14/939850
DATED : August 21, 2018
INVENTOR(S) : Kodner et al.

Page 1 of 1

It is certified that error appears in the above-identified patent and that said Letters Patent is hereby corrected as shown below:

In the Claims

In Column 26, Line 63, in Claim 16, delete "a social networking" and insert -- a networking --, therefor.

Signed and Sealed this
Thirteenth Day of November, 2018

Andrei Iancu
*Director of the United States Patent and Trademark Office*